United States Patent
Arnold

(10) Patent No.: US 9,977,683 B2
(45) Date of Patent: May 22, 2018

(54) DE-COUPLING USER INTERFACE SOFTWARE OBJECT INPUT FROM OUTPUT

(71) Applicant: Facebook, Inc., Menlo Park, CA (US)

(72) Inventor: Robert Douglas Arnold, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 116 days.

(21) Appl. No.: 13/715,762

(22) Filed: Dec. 14, 2012

(65) Prior Publication Data

US 2014/0173435 A1    Jun. 19, 2014

(51) Int. Cl.
*G06F 3/048* (2013.01)
*G06F 9/44* (2018.01)

(52) U.S. Cl.
CPC .................. *G06F 9/4443* (2013.01)

(58) Field of Classification Search
CPC .. G06F 3/048; G06F 9/52; G06F 9/50; G06G 5/00; G09G 5/36
See application file for complete search history.

(56) References Cited

U.S. PATENT DOCUMENTS

| | | | | |
|---|---|---|---|---|
| 6,286,027 B1 * | 9/2001 | Dwyer, III | ............. | G06F 9/384 712/217 |
| 6,574,720 B1 * | 6/2003 | Hopeman | ............. | G06F 12/084 707/999.202 |
| 6,804,815 B1 * | 10/2004 | Kerr | ............. | H04L 49/9094 712/218 |
| 6,845,430 B2 * | 1/2005 | Hopeman | ............. | G06F 12/084 707/999.202 |
| 7,269,693 B2 * | 9/2007 | Tremblay | ............. | G06F 9/3004 711/141 |
| 7,269,694 B2 * | 9/2007 | Tremblay | ............. | G06F 9/3004 711/141 |
| 7,269,717 B2 * | 9/2007 | Tremblay | ............. | G06F 9/3004 707/999.202 |
| 7,389,383 B2 * | 6/2008 | Tremblay | ............. | G06F 9/467 711/118 |
| 7,398,355 B1 * | 7/2008 | Moir | ............. | G06F 9/3004 711/118 |
| 7,418,577 B2 * | 8/2008 | Tremblay | ............. | G06F 9/3004 712/218 |

(Continued)

OTHER PUBLICATIONS

U.S. Appl. No. 13/715,653, filed Dec. 14, 2012, Arnold.

*Primary Examiner* — Kevin L Young
*Assistant Examiner* — F J Farhadian
(74) *Attorney, Agent, or Firm* — Baker Botts L.L.P.

(57) ABSTRACT

In one embodiment, a first thread of execution on a computing device receives a user-interface input. The first thread of execution is associated with a user interface of the computing device. The first thread of execution identifies a second thread of execution on the computing device to process the user-interface input. The second thread of execution is associated with the user interface and is de-coupled from the first thread of execution. The first thread of execution sends the user-interface input to the second thread of execution. The second thread of execution also processes the user-interface input to generate a user-interface output associated with the user-interface input.

20 Claims, 14 Drawing Sheets

(56) References Cited

U.S. PATENT DOCUMENTS

| | | | |
|---|---|---|---|
| 7,480,771 B2* | 1/2009 | Moir | G06F 12/0804 711/141 |
| 7,500,086 B2* | 3/2009 | Tremblay | G06F 9/3004 707/999.202 |
| 7,680,989 B2* | 3/2010 | Moir | G06F 9/3004 711/152 |
| 7,703,098 B1* | 4/2010 | Moir | G06F 9/467 711/147 |
| 7,818,510 B2* | 10/2010 | Tremblay | G06F 9/3004 711/145 |
| 7,904,664 B2* | 3/2011 | Tremblay | G06F 9/3004 711/145 |
| 7,930,695 B2* | 4/2011 | Chaudhry | G06F 9/52 711/137 |
| 8,074,030 B1* | 12/2011 | Moir | G06F 9/467 711/147 |
| 8,087,029 B1* | 12/2011 | Lindholm et al. | 718/105 |
| 8,095,741 B2* | 1/2012 | Heller, Jr. | G06F 9/3004 711/147 |
| 8,095,750 B2* | 1/2012 | Heller, Jr. | G06F 9/3004 707/703 |
| 8,117,403 B2* | 2/2012 | Heller, Jr. | G06F 12/0842 711/100 |
| 8,321,637 B2* | 11/2012 | Baum | G06F 9/466 707/703 |
| 8,411,103 B1* | 4/2013 | Kulshrestha et al. | 345/589 |
| 8,566,524 B2* | 10/2013 | Heller, Jr. | G06F 9/466 711/125 |
| 8,667,231 B2* | 3/2014 | Heller, Jr. | G06F 9/466 711/125 |
| 8,688,920 B2* | 4/2014 | Heller, Jr. | G06F 9/45504 707/703 |
| 8,738,862 B2* | 5/2014 | Heller, Jr. | G06F 9/466 711/125 |
| 2004/0117793 A1* | 6/2004 | Shaylor | 718/100 |
| 2006/0179289 A1* | 8/2006 | Floyd et al. | 712/227 |
| 2008/0147915 A1* | 6/2008 | Kleymenov | G06F 9/5016 710/52 |
| 2008/0165132 A1* | 7/2008 | Weiss | G06F 3/04883 345/173 |
| 2010/0250809 A1* | 9/2010 | Ramesh et al. | 710/200 |
| 2012/0092351 A1* | 4/2012 | Barnes | 345/505 |
| 2012/0188445 A1* | 7/2012 | Rodriguez et al. | 348/448 |
| 2013/0014037 A1* | 1/2013 | Fisher | G06F 9/542 715/760 |
| 2013/0014118 A1* | 1/2013 | Jones | 718/104 |
| 2013/0194286 A1* | 8/2013 | Bourd et al. | 345/545 |
| 2013/0222402 A1* | 8/2013 | Peterson et al. | 345/520 |
| 2014/0173435 A1* | 6/2014 | Arnold | 715/719 |

* cited by examiner

DE-COUPLING USER INTERFACE SOFTWARE OBJECT INPUT FROM OUTPUT

TECHNICAL FIELD

This disclosure generally relates to user interface.

BACKGROUND

A mobile computing device—such as a smartphone, tablet computer, or laptop computer—may include functionality for determining its location, direction, or orientation, such as a GPS receiver, compass, or gyroscope. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

A structured document such as a web page may include, for example, page layout information, scripts, page content such as text, media data (e.g., graphics, photos, video clips), and executable code objects (e.g., a game executable within a browser window or frame). Structured documents may be implemented with languages and technologies such as Hypertext Markup Language (HTML), Extensible Markup Language (XML), Extensible Hypertext Markup Language (XHTML), JavaScript, WebGL, Cascading Style Sheet (CSS) including CSS animations and transitions, and, frequently, Java. A structured document may itself include references to multiple structured documents and contents. For example, a web page may include one or more inline references by incorporating Uniform Resource Locations (URLs) and/or script code (e.g., JavaScript, PHP, AJAX) that in response to a user event (e.g., a mouse click, a mouse hover-over), causes an application displaying the web page in a graphical user interface to dynamically retrieve content specified by an URL and the script code.

SUMMARY OF PARTICULAR EMBODIMENTS

In particular embodiments, user-interface components of a graphical user interface of a software application on a computing device may be represented as layers, while the graphical user interface may be represented as a multi-layered-tree. The computing device may render the graphical user interface as a video based on the multi-layered-tree. Each frame of the video may correspond to transforming, adding, or removing one or more layers in the multi-layered-tree. In particular embodiments, the overall user interface of the computing device may be represented as a multi-layered-tree with each sub-tree of the multi-layered-tree representing a graphical user interface of a software application on the computing device. The computing device may render a video for the overall user interface with a single animation system, while a software application's user interface may be treated as an HTML element.

In particular embodiments, an input event associated with a user interface of a software application on a computing device may be de-coupled from its corresponding output. A first computing thread on the computing device may receive an input event, identify a second computing thread on the computing device to process the input event, and send the input event to the second computing thread. The second computing thread may process the input event to generate a corresponding output. Since the first computing thread is de-coupled from the second computing thread, the first computing thread may continue receiving and processing subsequent input events, even if the second thread is non-responsive to the first input event.

DESCRIPTION OF EXAMPLE EMBODIMENTS

A graphical user interface of an application allows a user to interact with the application. A graphical user interface may include components such as text and media data (e.g., an image, an video clip) conveying information to a user. A graphical user interface of an application may also include components such as menus, selectable icons or text, or other control or input elements that allow a user to execute commands associated with the application or navigate within the graphical user interface (or to a user interface of another application).

Particular embodiments describe methods for rendering a graphical user interface as a video. Each frame of the video may correspond to a particular placement of user interface components within the graphical user interface, while a new frame of the video may correspond to transforming, adding or removing one or more components within the graphical user interface. Particular embodiments also describe methods for de-coupling an input associated with a graphical user interface from a corresponding output. For example, particular embodiments may de-couple a touch input associated with a graphical user interface from rendering of the graphical user interface.

Figure 1:
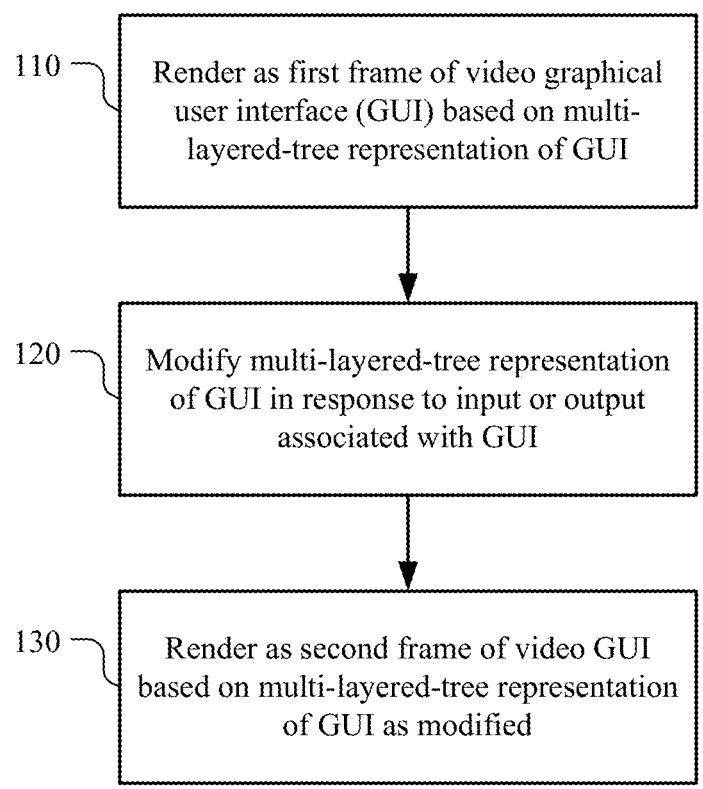
FIG. 1 illustrates an example method for rendering a graphical user interface as a video.

FIG. 1 illustrates an example method 100 for rendering a graphical user interface as a video. The method 100 may be implemented by a computing device. For example, the method 100 may be implemented by a process of an application (or an operating system) executing on one or more processors of the computing device. The computing device may be a desktop computer, a laptop computer, a tablet computer, a smartphone, or any suitable computing device with a display. The method 100 may begin at step 110. In particular embodiments, at step 110, the computing device may render as a first frame of a video a graphical user interface (GUI) of a software application on the computing device base on a multi-layered-tree representation of the graphical user interface.

Figure 2A:
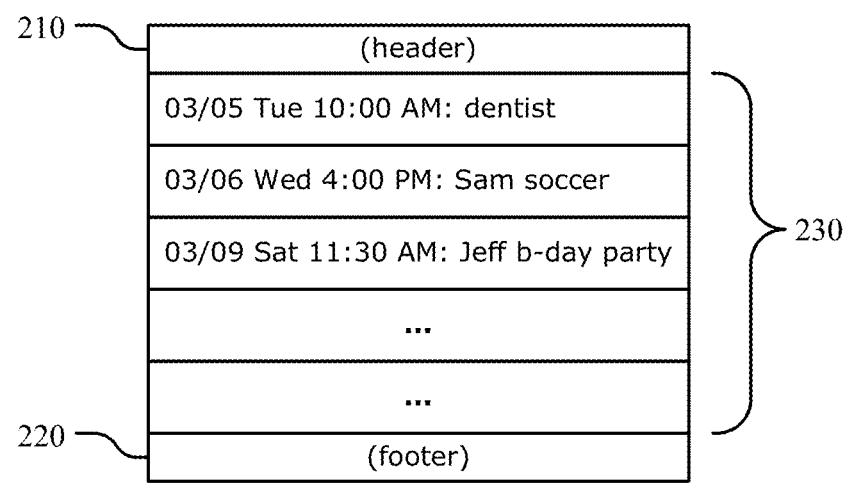
FIGS. 2A-2E illustrate an example graphical user interface with a list of content items and an example multi-layered-tree representation of the graphical user interface.
Figure 2B:
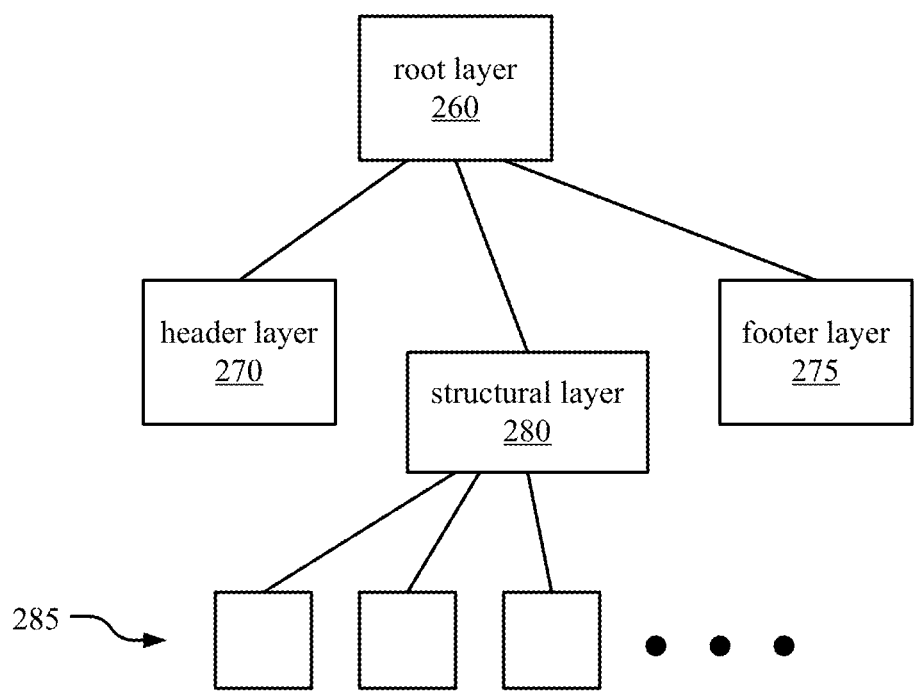

In particular embodiments, two-dimensional items of the graphical user interface may be represented as layers, while the graphical user interface may be represented as a multi-layered-tree—i.e., a tree structured with multiple levels of layers. The multi-layered-tree representation of the graphical user interface may comprise a root layer and one or more child layers. FIG. 2A illustrates an example graphical user interface 200 with a list of content items. For example, the example graphical user interface 200 may be a graphical user interface of a calendar application. The example graphical user interface 200 may include a header 210 (e.g., displaying a text string "Bob's Calendar"), a footer 220 (e.g., displaying a selectable icon "New Appointment"), and a list of content items 230 (e.g., a list of appointment items such as "03/05 Tue 10:00 AM: dentist", "03/06 Wed 4:00 PM: Sam soccer", and so on). The example graphical user interface 200 may be represented as a multi-layered-tree 250 illustrated in FIG. 2B. The example multi-layered-tree 250 may comprise a root layer 260 (e.g., representing a background color of the example graphical user interface 200), a child header layer 270 representing the header 210 illustrated in FIG. 2A, and a child footer layer 275 representing the footer layer 220 illustrated in FIG. 2A. The example multi-layered-tree 250 may also comprise a child structural layer 280 including children layers 285 that each represents a content item 230 illustrated in FIG. 2A. The structural layer 280 may serve as a structural "container" of its children layers 285. The structural layer 280 may not have its own content and may not be visible in the example graphical user interface 200.

In particular embodiments, each child layer of a multi-layered-tree representing a graphical user interface may comprise a geometrical property in its size and its transformation relative to its parent layer. For example, a content item layer 285 (illustrated in FIG. 2B) representing a particular content item 230 (illustrated in FIG. 2A) may have a geometrical property in a size of 300 pixels in width and 50 pixels in height, and a transformation of 250 pixels in a vertical direction and 0 pixel in horizontal direction relative to the structural layer 280. Another content layer 285 representing another content item 230 immediately below the particular content item 230 may have a geometrical property in a size of 300 pixels in width and 50 pixels in height, and a transformation of 300 pixels in a vertical direction and 0 pixel in horizontal direction relative to the structural layer 280. In one embodiment, a geometrical property of a layer in a multi-layered-tree may be represented by a four-by-four matrix. In particular embodiments, the computing device may determine a placement of a content item within the graphical user interface by multiplying the transformation of the content item's corresponding layer in the multi-layered-tree by the transformation of the layer's parent layer in the multi-layered-tree. That is, the computing device may calculate a placement of a particular layer within the graphical user interface by traversing the multi-layered-tree from the root layer to the particular layer and multiplying corresponding transformations.

In particular embodiments, the computing device may render the first frame of the video by generating a raster image (e.g., a bitmap image) for each of one or more layers of the multi-layered-tree representing the graphical user interface, and compositing or combining the raster images into a single frame (i.e., a single image) of the video to be displayed in a display on the computing device. The computing device may composite the raster images of the layers based on respective placements of the layers' two-dimensional items in the graphical user interface.

In particular embodiments, at step 120, the computing device may modify the multi-layered-tree representation of the graphical user interface in response to an input or output event associated with the graphical user interface of the software application. In particular embodiments, at step 130, the computing device may render as a second frame of the video the graphical user interface based on the multi-layered-tree representation of the graphical user interface as modified. In particular embodiments, the software application may be an event-driven software application. In particular embodiments, the input or output event associated with the graphical user interface may comprise user input provided through the graphical user interface of the software application.

Figure 2C:
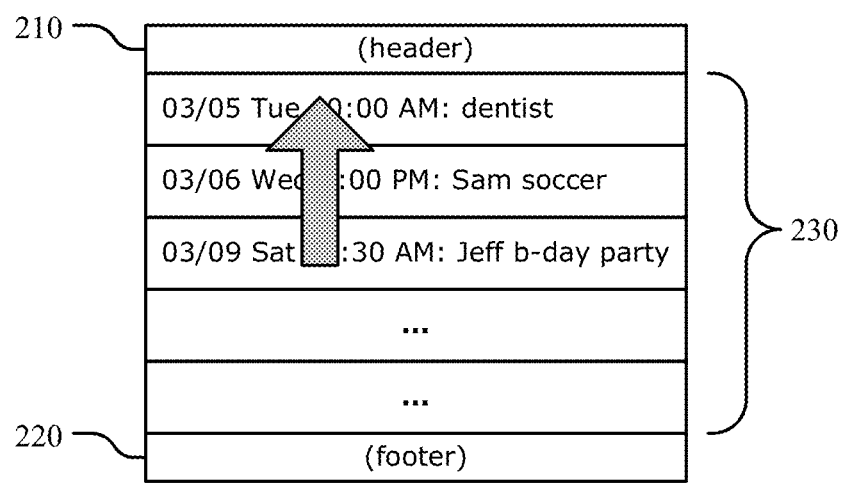
Figure 2D:
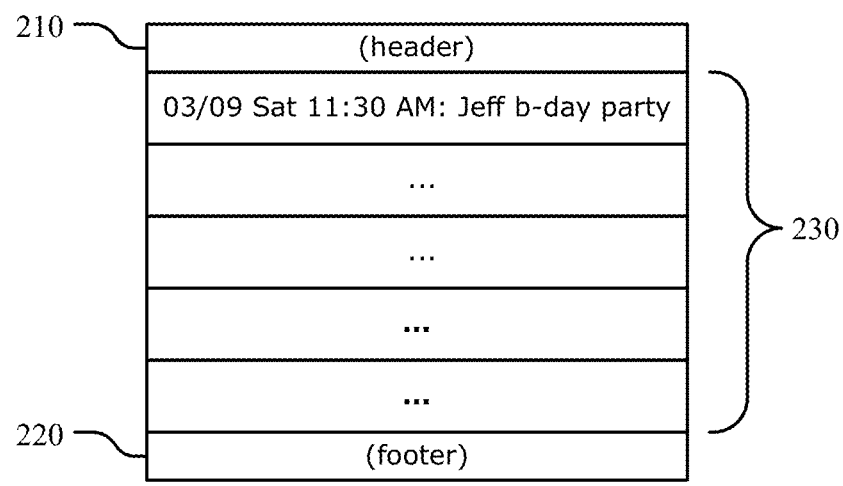

For example, the example graphical user interface 200 illustrated in FIG. 2A may be displayed in a touchscreen of the computing device. A user may scroll up the list of content items 230 of the example graphical user interface 200 by performing a sliding touch gesture on the example graphical user interface 200, as illustrated by the arrow in FIG. 2C. In response to the input event associated with the example graphical user interface 200 (i.e., the user scrolling-up touch gesture), the computing device may modify the corresponding multi-layered-tree 250 illustrated in FIG. 2B. Instead of changing the transformation of each content layer 285, the computing device may modify the transformation of the structural layer 280 relative to the root layer 260 (e.g., changing by 100 pixels in the upward vertical direction), while maintaining the respective transformation for content layers 285 relative to the structural layer 280. The computing device may render as a second frame of the video (for displaying the example graphical user interface 200) based on the multi-layered-tree representation as modified, as illustrated in FIG. 2D. For example, the computing device may composite respective raster images for layers of the multi-layered-tree 250 based on the modified transformation of the structured layer 280 relative to the root layer 260 as described above.

Figure 2E:
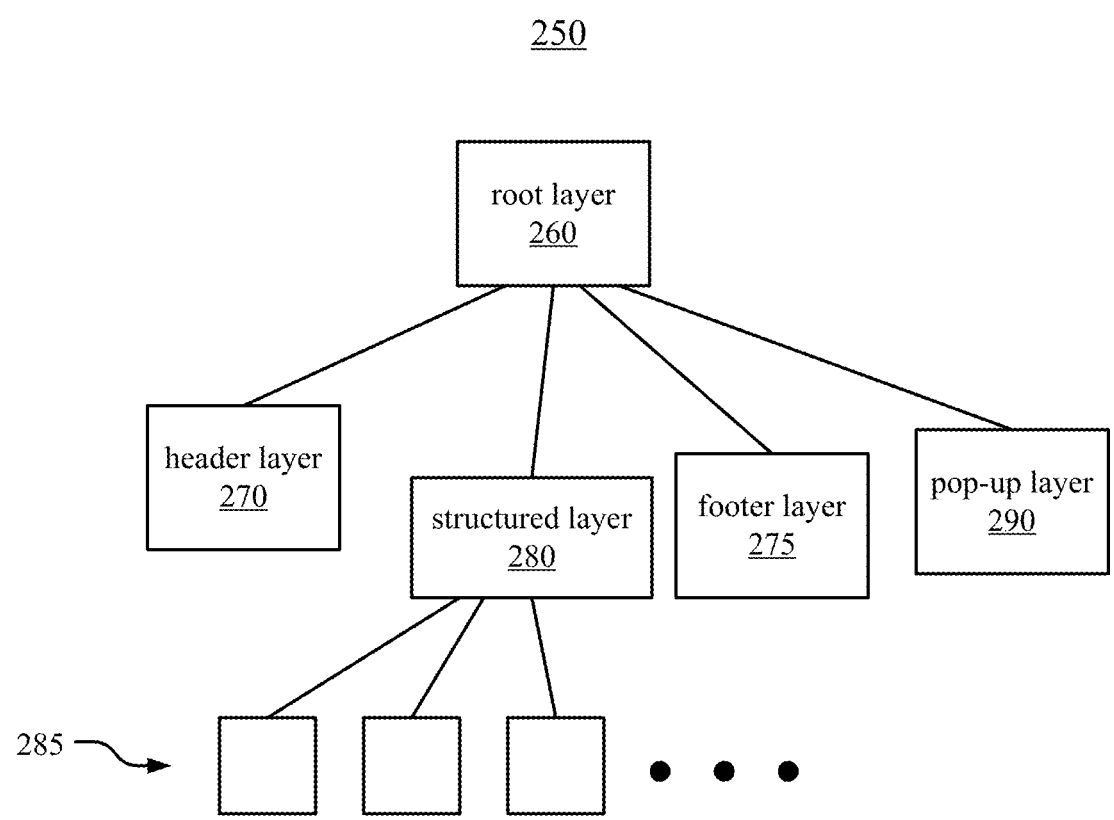

In particular embodiments, the computing device may modify the multi-layered-tree representation for the graphical user interface in response to an input or output event associated with the graphical user interface by adding a layer of the multi-layered-tree representation. For example, a user may perform a tap touch gesture on a particular content item 230 of the example graphical user interface 200 of a calendar application as illustrated in FIG. 2A, causing the calendar application to create a pop-up window displaying details of the particular content item 230. For another example, the calendar application may output a reminder of a particular content item 230 (e.g., based on a timer) by creating a pop-up window for the reminder. As illustrated in FIG. 2E, the computing device may add a layer 290 corresponding to the pop-up window, attach the layer 290 to the root layer 260 as a child layer to the root layer 260 of the example multi-layered-tree 250, and determine a geometrical property (size and transformation) for the layer. The computing device may, in response to the input event (user tap gesture) or the output event (reminder), render another frame of the video for the example graphical user interface 200 based on the example multi-layered-tree 250 as modified (i.e., with the added layer 290 as illustrated in FIG. 2E). The computing device may rendered the another frame by generating a raster image for the added layer 290, and composite raster images for the added layers 290 and other layers of the example multi-layered-tree 250 based on their respective placements.

In particular embodiments, the computing device may modify the multi-layered-tree representation for the graphical user interface in response to an input or output event associated with the graphical user interface by removing a layer of the multi-layered-tree representation. For example, the user may dismiss the pop-up window described above (e.g., by selecting a "Dismiss" icon displayed within the pop-up window). The computing device may, in response to the user's dismissal, remove the layer 290 corresponding to the pop-up window from the example multi-layered-tree 250, and render another frame of the video for the example graphical user interface 200 with remaining layers of the example multi-layered-tree 250 as modified (i.e., without the layer 290).

In particular embodiments, the overall user interface of the computing device (e.g., a home screen or a graphical representation of an operating system shell of the computing device) may be represented as a multi-layered-tree with each sub-tree of the multi-layered-tree representing a graphical user interface of a software application on the computing device. A window manager comprising one or more software components may manage input, output, and placement and displaying of components of the overall user interface based on the multi-layer-tree.

In particular embodiments, a root-layer of the multi-layered-tree representing a graphical user interface of a software application on the computing device may be a child of a multi-layered-tree representation associated with a window manager of the computing device. Furthermore, in particular embodiments, each of a plurality of graphical user interfaces of a plurality of software applications on the computing device has a multi-layered-tree representation with a root that is a child of the multi-layered-tree representation associated with the window manager. That is, every software application's graphical user interface may be represented by a multi-layered-tree that is a child structure of the multi-layered-tree representing the home screen of the computing device. In particular embodiments, the window manager (or another process executed by one or more processors of the computing device) may render a frame of a video for the home screen of the computing device based on the multi-layered-tree representation of the home screen.

Figure 3A:
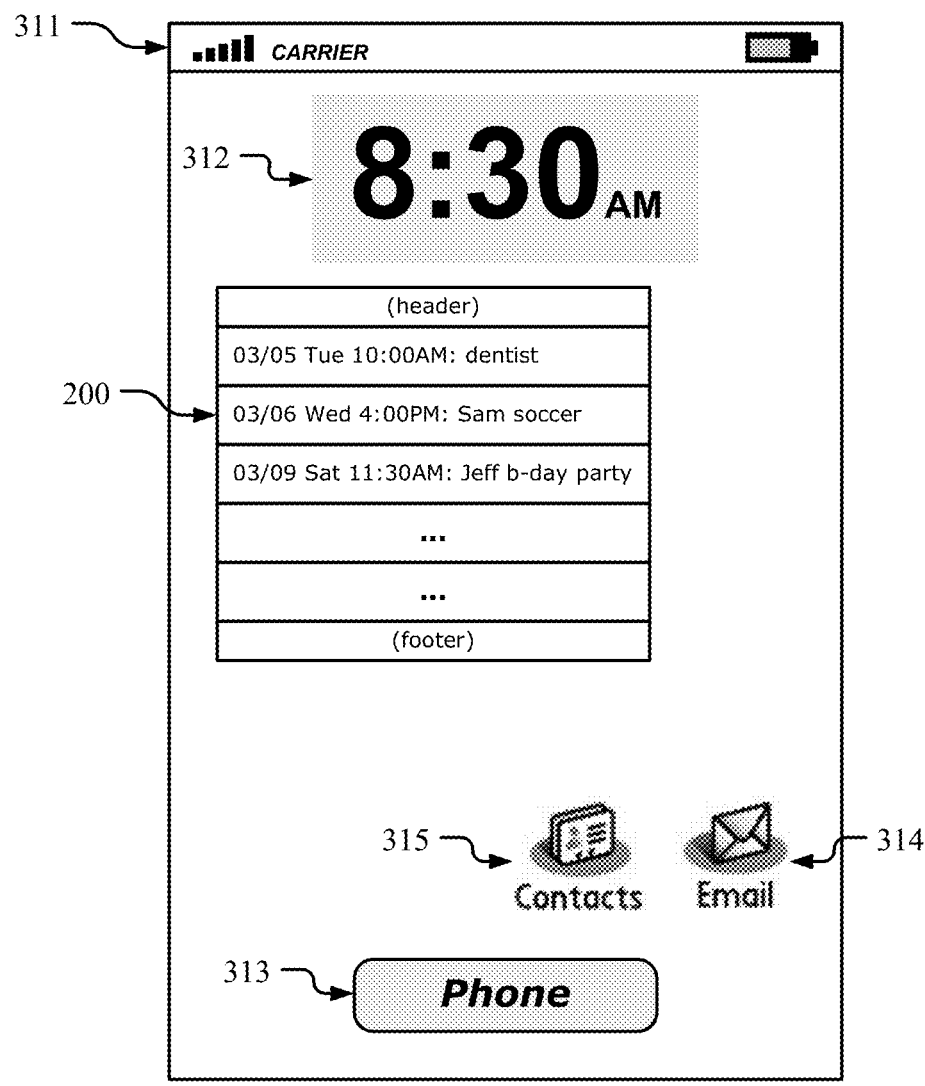
FIGS. 3A-3F illustrate an example home screen of a computing device and an example multi-layered-tree representation of the home screen.
Figure 3B:
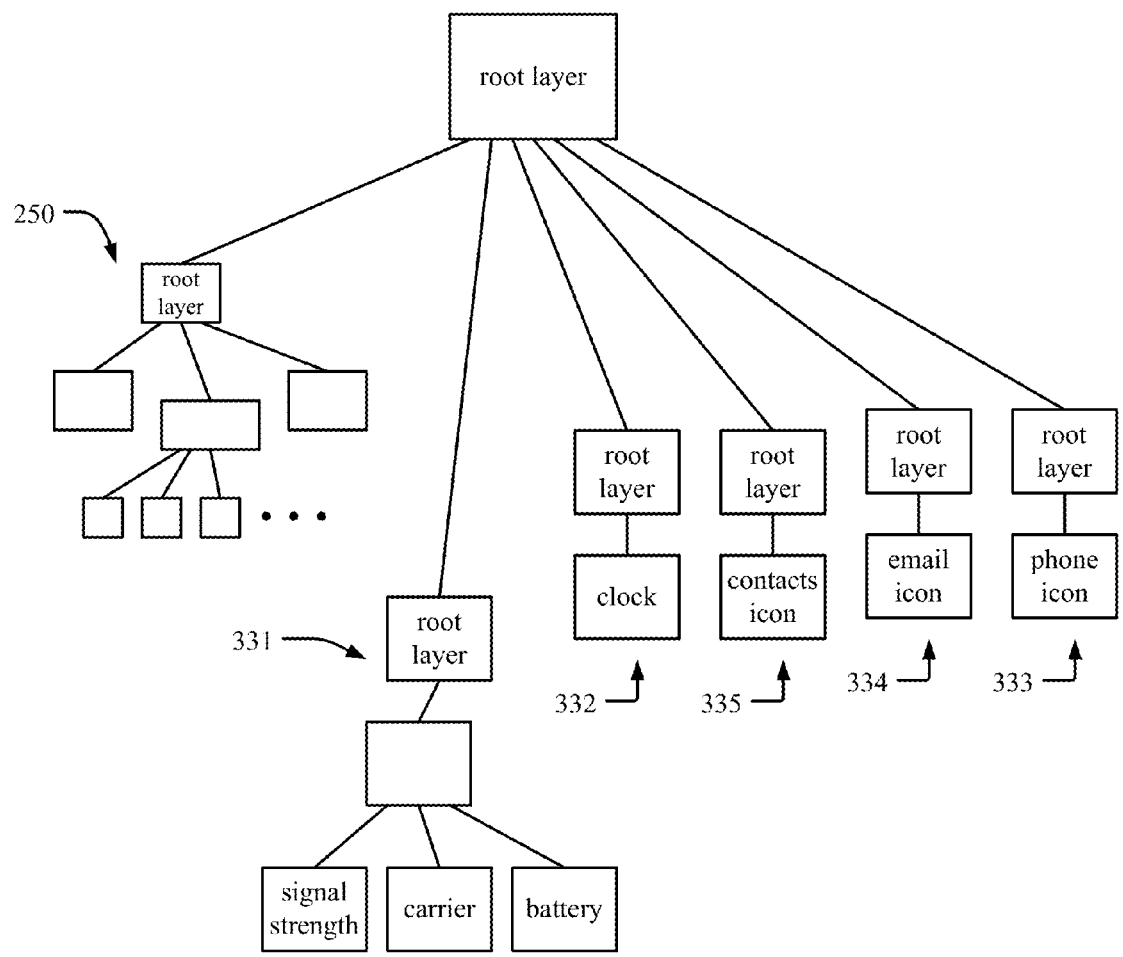

FIG. 3A illustrates an example home screen 300 of a computing device (e.g., a smartphone with a touchscreen). The home screen 300 may encompass the entire area of the computing device's display. FIG. 3B illustrates an example multi-layered-tree 320 representing the home screen 300. As illustrated in FIG. 3A, the example home screen 300 may comprise the example graphical user interface 200 of a calendar application illustrated in FIG. 2A. Meanwhile, the root layer of the multi-layered-tree 250 representing the example graphical user interface 200 for the calendar application may be a child layer of the multi-layered-tree 320 representing the home screen 300, as illustrated in FIG. 3B. For example, the home screen 300 illustrated in FIG. 3A may also comprise a status bar 311 including a cellular signal-strength indicator, a carrier indicator, and a battery indicator, a clock 312, a selectable icon 313 for a phone application, a selectable icon 314 for an email application, and a selectable icon 315 for a contacts application. For example, as illustrated in FIG. 3B, the status bar 311 may be represented by a multi-layered-tree 331 with its root being a child layer of the multi-layered-tree 320. The clock 312 may be represented by a multi-layered-tree 332 with its root being a child layer of the multi-layered-tree 320. The phone application icon 313 may be represented by a multi-layered-tree 333 with its root being a child layer of the multi-layered-tree 320. The email application icon 314 may be represented by a multi-layered-tree 334 with its root being a child layer of the multi-layered-tree 320. The contacts application icon 335 may be represented by a multi-layered-tree 335 with its root being a child layer of the multi-layered-tree 320. That is, each of the graphical user interfaces (of the software applications) within the home screen 300 may be represented as a sub-tree of the multi-layered-tree 320 representing the home screen 300. In one embodiment, a multi-layered-tree representation of a first software application on the computing device may be a child structure of a multi-layered-tree representation of a second software application on the computing device. Furthermore, each layer of the multi-layered-tree 330 may comprise a geometrical property in size and transformation (relative to respective parent layer) as described earlier. The window manager may calculate a placement for a child layer based on its own transformation and its parent's transformation as described earlier.

As described earlier with the method 100, the window manager may render a frame of a video for the home screen 300 based on the multi-layered-tree 320 representing the home screen 300. For example, the window manager may generate raster images for two-dimensional items of the home screen 300 (e.g., the status bar 311, the clock 312, the calendar application's graphical user interface 200, and so on), and calculate a placement for each of the two-dimensional items. The window manager may composite the raster images into a frame (a single image) of the video for the home screen 300 based on respective placements of the two-dimensional items within the home screen 300.

The window manager may modify the multi-layered-tree 320 representing the home screen 300 in response to an input or output event associated with the home screen 300. The window manager may modify the multi-layered-tree 320 by modifying a transformation of a layer, adding a layer to the multi-layered-tree 320, or removing a layer from the multi-layered-tree 320. The window manager may render another frame of the video for the home screen 320 based on the multi-layered-tree 320 as modified. For example, a user the computing device may dismiss the calendar application's graphical user interface 200 by performing a flick touch gesture as indicated by the arrow illustrated in FIG. 3C. In response to the user input event (i.e., the flick touch gesture), the window manager may remove children layers from the multi-layered-tree 250 representing the calendar application's graphical user interface 200, and attach to the root layer (of the multi-layered-tree 250) a child layer 351 representing a selectable icon for the calendar application, as illustrated in FIG. 3D. The window manager may also modify a transformation for the root layer (or the icon layer 351) for a location to place the icon within the home screen 300. The window manager may render another frame of the video for the home screen 300 based on the modified multi-layered-tree 320. FIG. 3E illustrates the home screen 300 rendered in response to the user's dismissal of the calendar's graphical user interface 200. The home screen 300 illustrated in FIG. 3E may include a selectable icon 345 for the calendar application and other two-dimensional items as rendered based on the modified multi-layered-tree 320 illustrated in FIG. 3D. As described above, the overall user interface of the computing device (e.g., a home screen) may be represented as a multi-layered-tree associated with a window manager, while each of graphical user interfaces of software applications on the computing device may be represented as a sub-tree with its root being a child of the overall multi-layered-tree associated with the window manager. As the overall multi-layered-tree structure is recursive, the window manager may treat each sub-tree as a video itself, in addition to treating the overall multi-layered-tree as another video (e.g., for the home screen). That is, the window manager may render a frame of a video for a software application's graphical user interface based on a change to a corresponding sub-tree (e.g., in response to an input or output event associated with the software application). The window manager may also render a frame of a video for the home screen based on a change to the overall multi-layered-tree.

In particular embodiments, a multi-layered-tree representing a graphical user interface of a software application on the computing device (or a home screen of the computing device) may be constructed with one or more structured documents. The computing device may render a frame of a video for the graphical user interface based on the multi-layered-tree by using a layout engine. A layout engine (or web browser engine) is a software component or library for rendering structured documents in a graphical user interface. For example, Google's Chrome web browser and Apple's Safari web browser use WebKit software to render web pages. WebKit includes a layout engine WebCore and a JavaScript engine JavaScriptCore (for interpreting and executes JavaScript code). An application (or an operating system) running on the computing device may utilize a layout engine to render structured documents by incorporating modules in the layout engine via an application programming interface (API) to the layout engine. As illustrated in FIGS. 3A to 3E, an entire graphical display (e.g., the home screen 300) of the computing device may be represented by a multi-layered-tree associated with a window manager of the display. Each of graphical user interfaces of software applications on the computing device may be represented as a (sub-)multi-layered-tree with its root being a child of the multi-layered-tree associated with the window manager. That is, the window manager (or another process running on the computing device) may treat a software application's graphical user interface as an ordinary HTML element (e.g., as an HTML <video> element). The window manager may also treat a software application's graphical user interface as a basic building block for a particular graphical user interface system being used (e.g., View for Android operating system provided by Google, Inc., UIView for iOS operating system provided by Apple, Inc., NSView for OS X operating system provided by Apple, Inc., window for Microsoft Windows operating system provided by Microsoft Corporation, or QWidget for Qt application framework originally developed by Nokia Oyj). The window manager may create animations or videos for the entire graphical display using one animation system (e.g., CSS). In another embodiment, the computing device may render a graphical user interface of a software application on the computing device (or a home screen of the computing device) as frames of a MPEG-4 video (or a video in any suitable compression-decompression format such as QuickTime format provided by Apple, Inc. or Windows Media Video format provided by Microsoft Corporation).

Particular embodiments may repeat one or more steps of the method of FIG. 1, where appropriate. Although this disclosure describes and illustrates particular steps of the method of FIG. 1 as occurring in a particular order, this disclosure contemplates any suitable steps of the method of FIG. 1 occurring in any suitable order. Moreover, although this disclosure describes and illustrates particular components, devices, or systems carrying out particular steps of the method of FIG. 1, this disclosure contemplates any suitable combination of any suitable components, devices, or systems carrying out any suitable steps of the method of FIG. 1.

Figure 4:
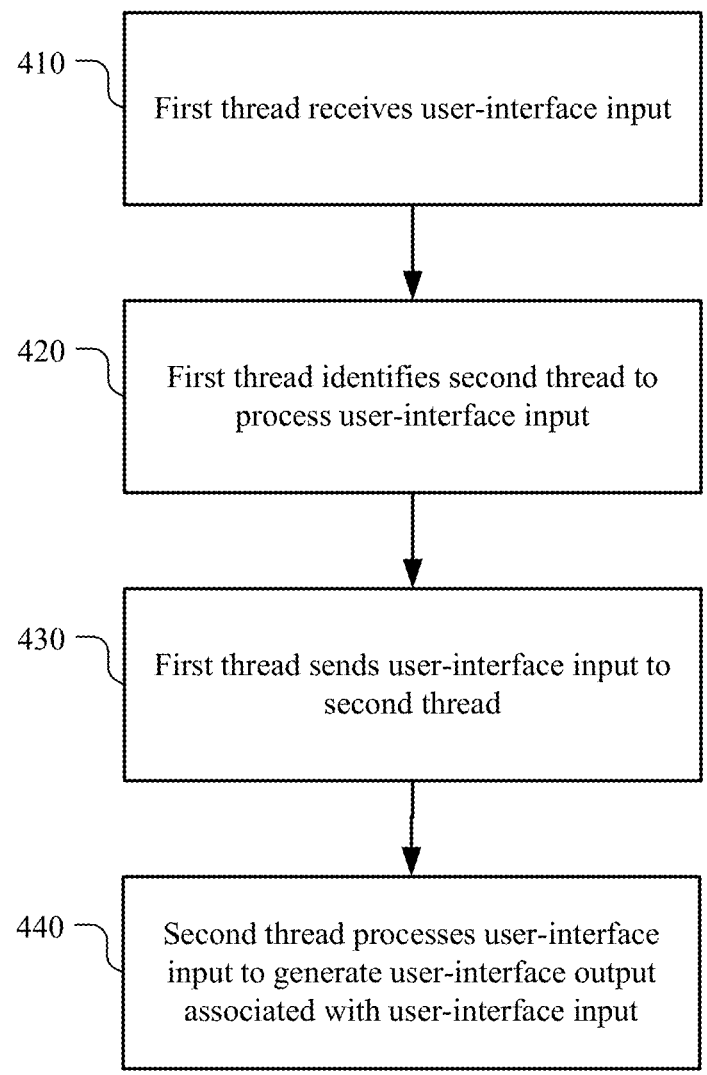
FIG. 4 illustrates an example method for de-coupling an input associated with a graphical user interface from a corresponding output.

FIG. 4 illustrates an example method 400 for de-coupling an input associated with a graphical user interface from a corresponding output. The method 400 may be implemented by a computing device with a display. For example, the method 400 may be implemented by one or more processes or computing threads executing on one or more processors of the computing device. The method 400 may begin at step 410. In particular embodiments, at step 410, a first thread of execution on a computing device may receive a user-interface input. For example, a user-interface input may comprise a user-input event, timer event, network event, or navigation event. In particular embodiments, the first thread may be associated with a user interface of the computing device. The user interface may be an operating system shell on the computing device. For example, the first thread may be associated with a window manager that manages a graphical user interface of an operating system shell (i.e., a home screen) of the computing device. The user interface may be a user interface of a software application on the computing device. For example, the first thread may be associated with a window manager that manages a graphical user interface of a software application on the computing device.

In particular embodiments, at step 420, the first thread of execution on the computing device may identify a second thread of execution on the computing device to process the user-interface input. In particular embodiments, at step 430, the first thread of execution on the computing device may send the user-interface input to the second thread of execution. In particular embodiments, at step 440, the second thread of execution on the computing device may process the user-interface input to generate a user-interface output associated with the user-interface input. For example, a user-interface output may comprise a graphics-output event (e.g., rendering a web page), network event, keyboard request, or navigation event. The second thread of execution may be associated with an event-driven software application. In particular embodiments, the second thread may be associated with the user interface. However, the second thread may be de-coupled from the first thread. That is, the first thread may not have to wait for processing the user-interface input by the second thread. The execution of the first thread may not be stopped if the second thread is non-responsive (e.g., in processing the user-interface input). Furthermore, in particular embodiments, if the second thread is non-responsive with respect to the user-interface input, the first thread (or another process or computing thread) may provide an indication through the user interface of the non-responsiveness.

Figure 3C:
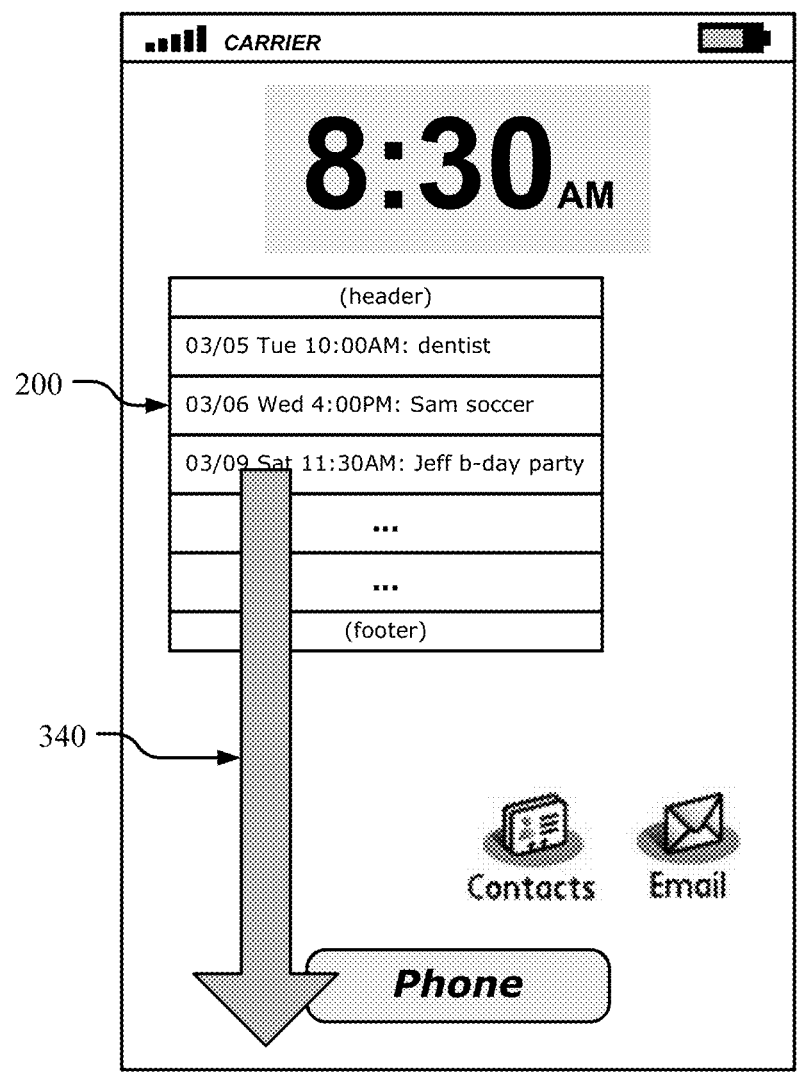
Figure 3D:
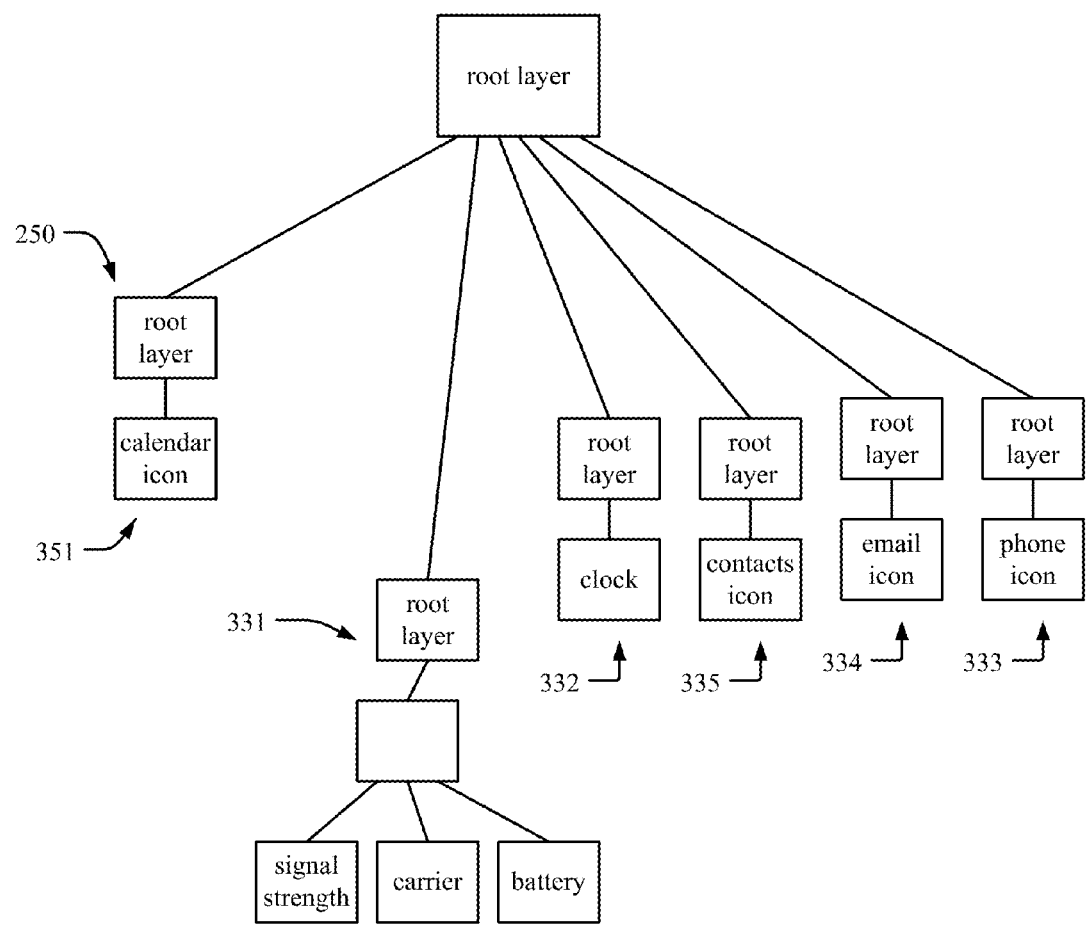
Figure 3E:
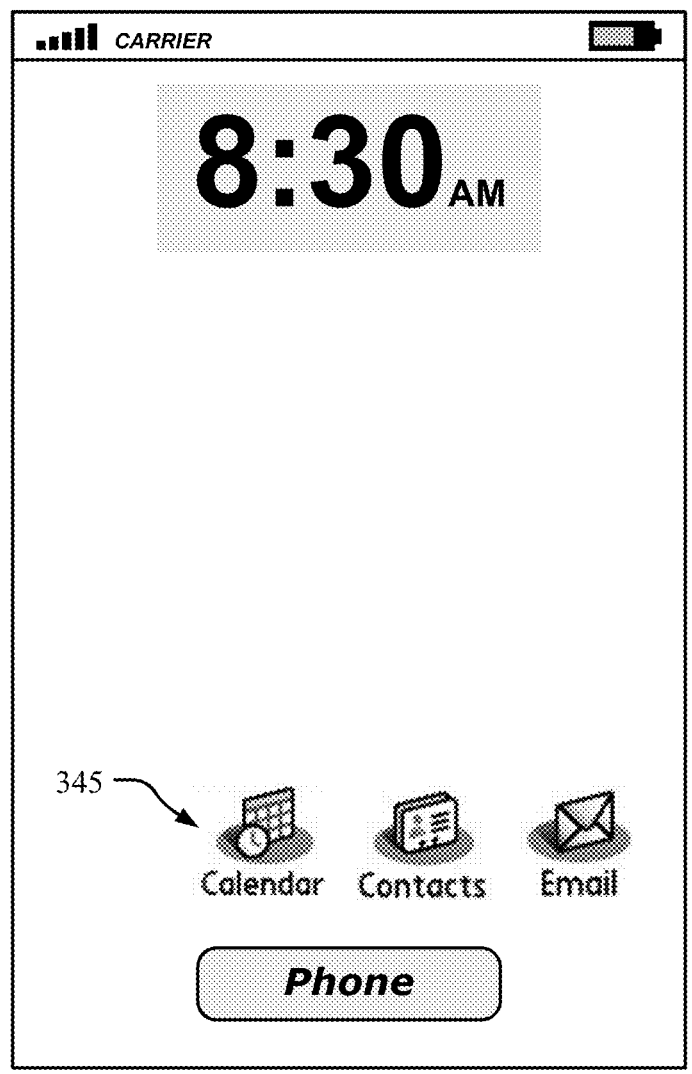
Figure 3F:
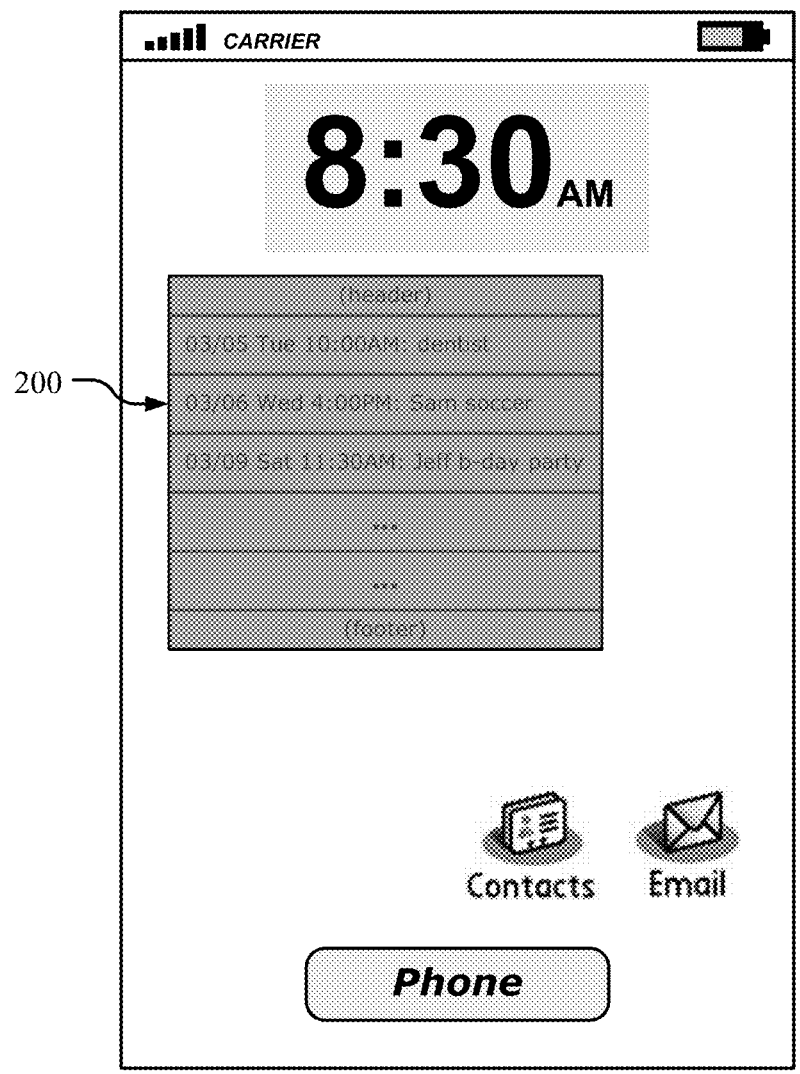

For example, the first thread may be a computing thread of the window manager managing the home screen 300 illustrated in FIG. 3C described earlier. The window manager may receive a user-interface input in a touch event indicated by the arrow illustrated in FIG. 3C. As described earlier, the touch event is a flick touch gesture by a user to dismiss the graphical user interface 200 of an calendar application. The window manager may identify a second thread (de-coupled from the first thread) to process the touch event. The second thread may be another computing thread of the window manager spun off by the first thread. The first thread may send the touch event to the second thread. The second thread may process the touch event by generating the home screen 300 (a user-interface output) illustrated in FIG. 3E. The second thread may also cause the operating system of the computing device to stop execution of the calendar application (or to execute the calendar application with a background process). If the second thread is not responsive to the touch event (e.g., if the execution of the calendar application is hung or frozen), the first thread may provide a visual indication such as dimming the graphical user interface 200 of the calendar application, as illustrated in FIG. 3F. Here, since the second thread is de-coupled from the first thread, the non-responsiveness of the second thread may not block execution of the first thread (or the window manager).

In particular embodiments, the first thread of execution may send the user-interface input to the second thread of execution by sending the user-interface input to a buffer (e.g., a software buffer) associated with the second thread of execution. The buffer may be configured to store the user-interface input for the second thread of execution while the second thread of execution processes other input (or is non-responsive). For example, in the example of the touch event (of a user's flick touch gesture) illustrated in FIG. 3C describer above, the user may just added a new appointment before dismissing the calendar application. The first thread may send the second thread the touch event while the second thread is processing the new appointment (e.g. instructing the calendar application to store the new appointment in a remote server). The first thread may send the touch event to a buffer associated with the second thread. After completing processing the new appointment, the second thread may look up the buffer for a next task (e.g., dismissing the calendar application), and process the next task (and clear the task from the buffer).

In particular embodiments, the first thread of execution may assigns a sequence number to the user-interface input identifying its position in a sequence of user-interface inputs. For example, in the example of the touch event (of a user's flick touch gesture) illustrated in FIG. 3C describer above, the flick touch gesture includes three touch inputs: a touch-down input, a touch-move input, and a touch-up input. The first thread may assign sequence numbers 101, 102, and 103 to the touch-down input, the touch-move input, and the touch-up input, respectively. The first thread may send the three touch inputs with corresponding sequence numbers to a buffer associated with the second thread. The second thread may interpret a first user input with the earliest sequence number in the buffer (e.g., the touch-down input with the sequence number 101). The second thread may recognize the first user input (e.g., as a tap touch gesture) and process the first user input accordingly (and clear the first user input from the buffer). The second thread may also clear out the second and third user inputs from the buffer, as the second thread is not interested in them any more. That is, not all user-interface inputs stored in the buffer are consumed. The second thread may interpret the first user input with one or more additional user inputs stored in the buffer. For example, the second thread may interpret the first three user inputs in the buffer (e.g., the touch-down input 101, the touch-move input 102, and the touch-up input 103). The second thread (or the calendar application) may recognize the first three inputs combined as a flick touch gesture, and process the flick touch gesture accordingly (e.g., dismissing the graphical user interface 200 from the home screen 300). The second thread may also clear the first three input events from the buffer. In other embodiments, the first thread (e.g., the window manager) may interpret user-interface inputs with sequence numbers. For example, the first thread may interpret the first input 101 (the touch-down input) described above as a tap touch gesture for the calendar application, and send the tap touch gesture to the calendar application for processing. The first thread may also discard the second and third inputs 102 and 103 (the touch-move and the touch-up inputs). Or the first thread may interpret the inputs 101, 102 and 103 as a flick touch gesture for the calendar application, and send the flick touch gesture to the calendar application for processing.

In particular embodiments, the first thread (the window manager) may vary a size of the buffer associated with the second thread based on processing or acknowledgement latency associated with the second thread. For example, the first thread may increase the buffer size if the buffer is full (e.g., due to non-responsiveness of the second thread). The first thread may also provide a visual indication (such as dimming a corresponding graphical user interface illustrated in FIG. 3F) that the second thread (an application associated with the second thread) is not responsive. The first thread may also throttle the rate or quality at which the first thread send events to the second thread such that the overall latency for the entire user interface (e.g., the home screen) may be lessened.

The method 100 and the method 400 may provide a flexible implementation of a graphical user interface that is always responsive. For example, a first computing thread of a software application (or an operating system) on a computing device may post a touchscreen keyboard (a graphical user interface of a keyboard application) in the computing device's touchscreen. The touchscreen keyboard may be represented by a child multi-layered-tree of a multi-layered-tree representation of a home screen of the computing device. Since the touchscreen keyboard may be represented as an ordinary HTML element (not a window within another application's window), the touchscreen keyboard may be placed anywhere within the home screen and may overlap with a graphical user interface of any other software application on the computing device. In response to a touch input by a user on the touchscreen keyboard, the first thread may identify a second computing thread to process the user input (e.g., a thread associated with another software application on the computing device). Since the second thread is de-coupled from the first thread, the touchscreen keyboard may be always responsive to additional user touch inputs, even if the second thread is none-responsive to a first user input.

Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Figure 5:
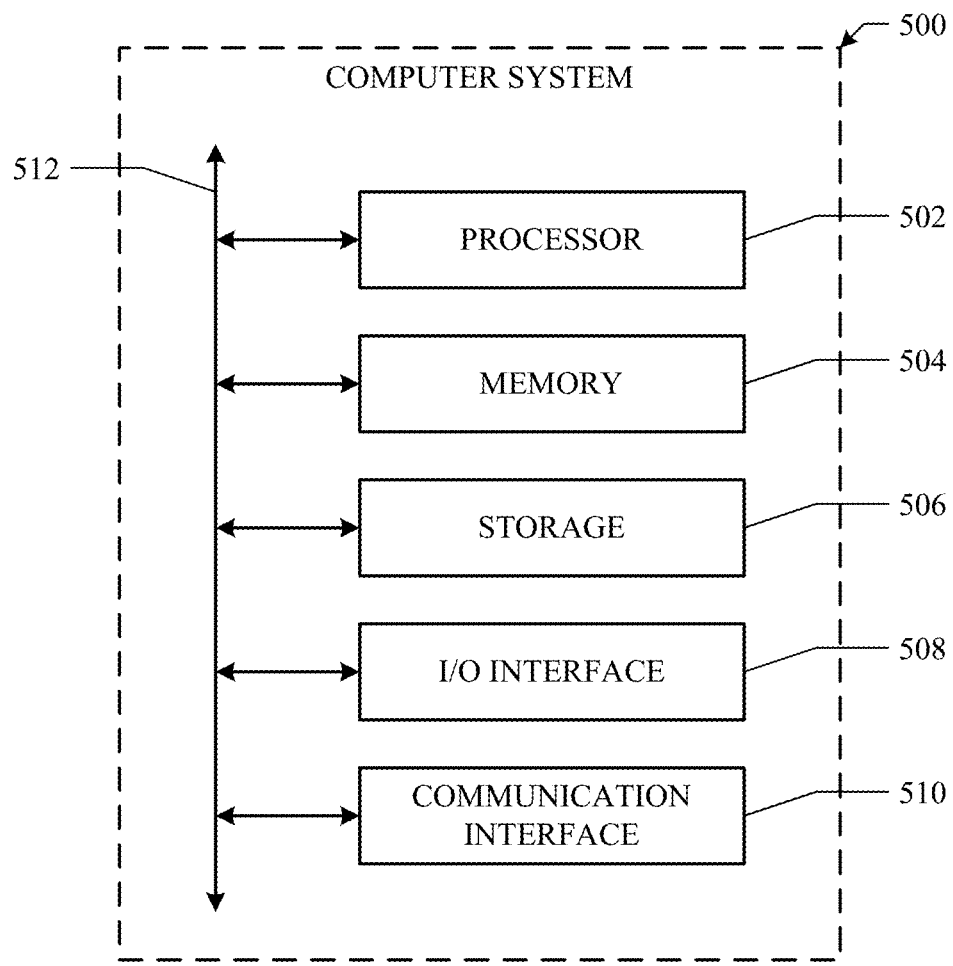
FIG. 5 illustrates an example computer system.

FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
   by a first thread of execution on a computing device, receiving one or more user-input events associated with one or more user inputs on a user interface displayed on the computing device;
   by the first thread, identifying a second thread of execution on the computing device to process the one or more user-input events, the second thread being de-coupled from the first thread, and wherein the second thread is associated with a software application on the computing device and is configured to process the one or more user-input events for the software application;
   by the first thread, sending the one or more user-input events to a software buffer associated with the second thread;

by the second thread, processing the one or more user-input events in the software buffer to generate a user-interface output based on the one or more user-input events;

by the first thread receiving subsequent user-input events when the second thread is hung;

by the first thread, sending the subsequent user-input events to the software buffer associated with the second thread; and by the first thread, providing an indication, through the user interface, of non-responsiveness with respect to user interface input;

wherein when the one or more user-input events comprise a sequence of multiple user-input events each having a sequence number identifying its position in the sequence of multiple user-input events, the processing the multiple user-input events by the second thread comprises:

interpreting the sequence of multiple user-input events as a single gesture on the user interface for commanding the software application;

in response to interpreting the sequence of multiple user-input events as the single gesture for commanding the software application, generating the user-interface output based on the single gesture;

in response to determining that an earliest user-input event in the sequence of multiple user-input events corresponds to a command for the software application, generating the user-interface output based on the earliest user-input event, the earliest user-input event having an earliest sequence number in the buffer; and clearing the sequence of multiple user-input events from the buffer.

2. The method of claim 1, wherein:
the first thread of execution is associated with a window manager of an operating system (OS) of the computing device.

3. The method of claim 1, wherein the user-interface output comprises a graphics-output event, network event, keyboard request, or navigation event.

4. The method of claim 1, wherein the software buffer is configured to store the user-input events for the second thread of execution while the second thread of execution processes other input.

5. The method of claim 1, wherein the user interface of the computing device is responsive to user touch input received on a touchscreen of the computing device, the user-input events being processed by the second thread is received in a first touch event, and the first thread continues to receive the subsequent user-input events on the touchscreen in one or more second touch events when the second thread is hung.

6. The method of claim 1, wherein the second thread of execution is associated with rendering of a web page or an event-driven software application, and
the first thread is responsive to the subsequent user input when the second thread of execution is rendering the web page or executing the event-driven software application.

7. One or more computer-readable non-transitory storage media embodying software that is operable when executed by a computing device to:
by a first thread of execution on a computing device, receive one or more user-input events associated with one or more user inputs on a user interface displayed on the computing device;

by the first thread, identify a second thread of execution on the computing device to process the one or more user-input events, the second thread being de-coupled from the first thread, and wherein the second thread is associated with a software application on the computing device and is configured to process the one or more user-input events for the software application;

by the first thread, send the one or more user-input events to a software buffer associated with the second thread;

by the second thread, process the one or more user-input events in the software buffer to generate a user-interface output based on the one or more user-input events;

by the first thread, receive subsequent user-input events when the second thread is hung;

by the first thread, send the subsequent user-input events to the software buffer associated with the second thread; and by the first thread, provide an indication, through the user interface, of non-responsiveness with respect to user interface input;

wherein when the one or more user-input events comprise a sequence of multiple user-input events each having a sequence number identifying its position in the sequence of multiple user-input events, the processing of the multiple user-input events by the second thread comprises:

interpreting the sequence of multiple user-input events as a single gesture on the user interface for commanding the software application;

in response to interpreting the sequence of multiple user-input events as the single gesture for commanding the software application, generating the user-interface output based on the single gesture;

in response to determining that an earliest user-input event in the sequence of multiple user-input events corresponds to a command for the software application, generating the user-interface output based on the earliest user-input event, the earliest user-input event having an earliest sequence number in the buffer; and clearing the sequence of multiple user-input events from the buffer.

8. The media of claim 7, wherein:
the first thread of execution is associated with a window manager of an operating system (OS) of the computing device.

9. The media of claim 7, wherein the user-interface output comprises a graphics-output event, network event, keyboard request, or navigation event.

10. The media of claim 7, wherein the buffer is configured to store the user-input events for the second thread of execution while the second thread of execution processes other input.

11. The media of claim 7, wherein the first thread of execution is associated with a window manager of the user interface.

12. A system comprising one or more processors and a memory coupled to the processors comprising instructions executable by the processors, the processors being operable when executing the instructions to:
by a first thread of execution on the system, receive one or more user-input events associated with one or more user inputs on a user interface displayed on the computing device;

by the first thread, identify a second thread of execution on the system to process the one or more user-input events, the second thread being de-coupled from the first thread, and wherein the second thread is associated with a software application on the computing device and is configured to the one or more process user-input events for the software application;

by the first thread, send the one or more user-input events to a software buffer associated with the second thread;

by the second thread, process the one or more user-input events in the software buffer to generate a user-interface output based on the one or more user-input events;

by the first thread, receive subsequent user-input events when the second thread is hung;

by the first thread, send the subsequent user-input events to the software buffer associated with the second thread; and by the first thread, provide an indication, through the user interface, of non-responsiveness with respect to user interface input;

wherein when the one or more user-input events comprise a sequence of multiple user-input events each having a sequence number identifying its position in the sequence of multiple user-input events, the processing of the multiple user-input events by the second thread comprises:

interpreting the sequence of multiple user-input events as the single gesture on the user interface for commanding the software application;

in response to interpreting the sequence of multiple user-input events as single gesture for commanding the software application, generating the user-interface output based on the single gesture;

in response to determining that an earliest user-input event in the sequence of multiple user-input events corresponds to a command for the software application, generating the user-interface output based on the earliest user-input event, the earliest user-input event having an earliest sequence number in the buffer; and clearing the sequence of multiple user-input events from the buffer.

13. The method of claim 1, further comprising:
by the first thread, increasing a size of the software buffer.

14. The method of claim 13, wherein, by the first thread, the increasing the size of the software buffer includes by the first thread, increasing the size of the software buffer if the software buffer is full.

15. The method of claim 1, further comprising:
by the first thread, throttling a rate or a quality at which the first thread sends the one or more user-input events to the second thread.

16. The media of claim 7, wherein the software that is further operable when executed by the computing device to:
increase a size of the software buffer.

17. The media of claim 16, wherein, to increase the size of the software buffer, the software that is further operable when executed by the computing device to:
increase the size of the software buffer if the software buffer is full.

18. The media of claim 7, further comprising:
by the first thread, throttling a rate or a quality at which the first thread sends the one or more user-input events to the second thread.

19. The system of claim 12, wherein the memory coupled to the processors further comprising instructions executable by the processors, the processors being operable when executing the instructions to:
increase a size of the software buffer.

20. The system of claim 19, wherein, to increase the size of the software buffer, the memory coupled to the processors further comprising instructions executable by the processors, the processors being operable when executing the instructions to:
increase the size of the software buffer if the software buffer is full.

\* \* \* \* \*